United States Patent [19]

Carson et al.

[11] Patent Number: 4,720,405

[45] Date of Patent: Jan. 19, 1988

[54] METHOD OF PROVIDING A SUBSTRATE WITH A FLEXIBLE MULTILAYER COATING

[75] Inventors: Dennis W. Carson, Lower Burrell; Robert J. Schmitt; Carl A. Seneker, both of Pittsburgh, all of Pa.; Thomas A. Van Kuren; David R. Wallace, both of Dublin, Ohio

[73] Assignee: PPG Industries, Inc., Pittsburgh, Pa.

[21] Appl. No.: 946,254

[22] Filed: Dec. 24, 1986

Related U.S. Application Data

[62] Division of Ser. No. 808,762, Dec. 13, 1985, Pat. No. 4,680,346.

[51] Int. Cl.$^4$ .......................... B05D 3/02; B32B 27/38
[52] U.S. Cl. .................... 427/410; 427/407.1; 428/414; 428/416; 428/421; 428/422; 428/424.4; 428/424.6; 525/939
[58] Field of Search ...................... 525/481, 528, 939; 427/407.1, 409, 410; 428/414, 416

[56] References Cited

U.S. PATENT DOCUMENTS

| | | | |
|---|---|---|---|
| 4,259,472 | 3/1981 | Chattha et al. | 528/72 |
| 4,508,767 | 4/1985 | Hokamura et al. | 427/407.1 |
| 4,546,141 | 10/1985 | Gebauer | 427/409 X |
| 4,547,410 | 10/1985 | Panush | 427/409 X |
| 4,556,647 | 6/1985 | Schönfelder et al. | 427/385.5 X |
| 4,557,977 | 12/1985 | Memmer et al. | 428/421 |

OTHER PUBLICATIONS

Raymond R. Meyers, et al., *Film Forming Composition*, vol. 1, p. 488, Dekker Inc., N.Y. (1967).

*Primary Examiner*—Thurman K. Page
*Attorney, Agent, or Firm*—Linda Pingitore

[57] ABSTRACT

A coating composition contains an organic polyol, a polyepoxide, a polyisocyanate crosslinking agent, and a phenolic resin. The composition is flexible, having an elongation of at least 10 percent when cured. This coating composition is particularly suitable as a primer in preparing substrates with a multilayer coating having good flexibility.

27 Claims, No Drawings

METHOD OF PROVIDING A SUBSTRATE WITH A FLEXIBLE MULTILAYER COATING

This is a division of application Ser. No. 808,762, filed Dec. 13, 1985, now U.S. Pat. No. 4,680,346.

BACKGROUND OF THE INVENTION

The present invention relates to coating compositions suitable as primers. The present invention also relates to substrates having a multilayer coating, one of the layers being a primer composition.

In the production of coating compositions for structural building components such as metal building panels there are often competing goals to be reconciled. On the one hand, there is the need for good durability properties such as color retention, mar resistance and chalk resistance in the face of severe weather conditions as well as corrosive industrial pollutants. On the other hand, there is the requirement of good flexibility to facilitate fabrication of the metal without loss of the coating's adhesion.

In the coil coating area the difficulties are exemplified by the conventionally utilized plastisol based coating compositions. Plastisols are desirable coating vehicles from the standpoint of fabrication, however, they exhibit poor durability, color retention, chalk resistance and dirt resistance. As a result, compromises must often be made either in terms of ultimate film properties or workability of the coated substrate.

There is a need, therefore, for a way to achieve a coating which results in not only good durability, but also workability and ease of fabrication of the coated substrate.

SUMMARY OF THE INVENTION

In accordance with the present invention there is provided a coating composition comprising an organic polyol, a polyepoxide, a polyisocyanate crosslinking agent and a phenolic resin. The coating compositions of the present invention are particularly suitable as primer coating compositions.

Also provided in accordance with the present invention is a method of providing a substrate with a multilayer coating comprising:
a. applying a flexible primer coating composition to a substrate, said primer coating composition having an elongation of at least 10 percent when cured;
b. applying a pigmented coating composition to the coated substrate of step (a), said pigmented coating composition comprising a fluorocarbon polymer;
c. applying a clear coating composition to the coated substrate of step (b), said clear coating composition comprising a fluorocarbon polymer; and
d. at least partially curing the coated substrate of step (c);

said multilayer coating having an elongation of at least 10 percent when cured.

DETAILED DESCRIPTION OF THE INVENTION

The coating composition of the present invention comprises as one component an organic polyol. A wide variety of polyols are useful in the practice of the present invention. The polyols generally have a hydroxyl value of at least 30, typically a value within the range of from about 40 to about 200. The hydroxyl values are determined on polyol solids only, exclusive of any solvents or solubilizing agents, according to the method of ASTM E 222-73. The polyols are generally polymeric polyols having a number average molecular weight ranging from about 500 to about 20,000, preferably from about 1,000 to about 5,000.

Molecular weight is determined by gel permeation chromatography (GPC) using a differential refractometer as the detector. The instrument is first calibrated using a polystyrene standard. Polystyrene standards used were purchased from Pressure Chemicals Company, Pittsburgh, Pennsylvania. The polystyrene standards have dispersities (dispersity = weight average molecular weight/number average molecular weight) ranging from 1.05 to 1.10. The viscosity average molecular weights of the polystyrene standards used were 900,000; 233,000; 50,000; 17,500; 4,000. To obtain a calibration curve, a set of 0.1 percent (10 milligram polystyrene/1.0 ml tetrahydrofuran) polystyrene solutions in tetrahydrofuran were prepared and a 0.5 ml sample size was injected into the columns and a GPC chromatogram was obtained. The elution volume of each peak corresponding to a given molecular weight of the polystyrene standard was measured and the data was plotted on a semilogarithmic paper (logarithm scale in the ordinate and linear scale in the abscissa). A linear least squares plot of $\log_{10}$ (molecular weight) versus elution volume in milliliters is used as a calibration curve. The lowest molecular weight of the polystyrene standard used was 4,000, and the calibration curve beyond that was extrapolated down to 100. The upper and lower exclusion limits of this set of columns are 5,000,000 and 100, respectively, in terms of polystyrene molecular weight. The sample whose molecular weights are to be determined was prepared as a 1.0 percent tetrahydrofuran solution. After filtration through a 0.5 micron filter, available from Millapore Corporation, a 0.5 ml sample size was injected into the columns and a GPC chromatogram obtained under the same experimental conditions as the calibration. From the resulting calibration curve of molecular weight versus retention time, a molecular weight relative to the standard can be assigned to the retention times of the sample. The height (H) of the curve at the corresponding retention times is recorded by the computer. From these height-molecular weight (M) combinations the following averages are calculated:

$$\text{Number average molecular weight} = \frac{\Sigma H}{\Sigma H/M}$$

This is the number reported.

Examples of the many suitable polyols include acrylic polyols, polyester polyols, polyurethane polyols and polyether polyols.

Examples of polyether polyols are polyalkylene ether polyols which include those having the following structural formula:

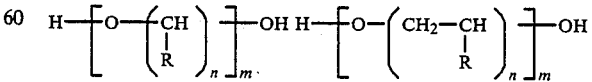

where the substituent R is hydrogen or lower alkyl containing from 1 to 5 carbon atoms including mixed substituents, and n is typically from 2 to 6 and m is from 10 to 100 or even higher. Included are poly(oxytetramethylene) glycols, poly(oxyethylene) glycols, poly- (oxy-1,2-propylene) glycols and the reaction products of ethylene glycol with a mixture of 1,2-propylene oxide and ethylene oxide.

Also useful are polyether polyols formed from oxyalkylation of various polyols, for example, glycols such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds as sorbitol or sucrose. One commonly utilized oxyalkylation method is by reacting a polyol with an alkylene oxide, for example, ethylene or propylene oxide, in the presence of an acidic or basic catalyst.

Polyester polyols can also be used as the polyol component of the invention. Polyester polyols can be prepared by the polyesterification of an organic polycarboxylic acid or anhydride thereof with organic polyols and/or an epoxide. Usually, the polycarboxylic acids and polyols are aliphatic or aromatic dibasic acids and diols.

The diols which are usually employed in making the polyester include alkylene glycols, such as ethylene glycol, neopentyl glycol and other glycols such as hydrogenated Bisphenol A, cyclohexanediol, cyclohexanedimethanol, caprolactonediol, for example, the reaction product of epsilon-caprolactone and ethylene glycol, hydroxy-alkylated bisphenols, polyether glycols, for example, poly(oxytetramethylene) glycol and the like. Polyols of higher functionality can also be used. Examples include trimethylolpropane, trimethylolethane, pentaerythritol and the like, as well as higher molecular weight polyols such as those produced by oxyalkylating lower molecular weight polyols.

The acid component of the polyester consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid, decanoic acid, dodecanoic acid, and other dicarboxylic acids of varying types. The polyester may include minor amounts of monobasic acids such as benzoic acid, stearic acid, acetic acid, hydroxystearic acid and oleic acid. Also, there may be employed higher polycarboxylic acids such as trimellitic acid and tricarballylic acid. Where acids are referred to above, it is understood that anhydrides of those acids which form anhydrides can be used in place of the acid. Also, lower alkyl esters of the acids such as dimethyl glutarate and dimethyl terephthalate can be used.

Besides polyester polyols formed from polybasic acids and polyols, polylactone-type polyesters can also be employed. These products are formed from the reaction of a lactone such as epsilon-caprolactone and a polyol. The product of a lactone with an acid-containing polyol can also be used.

In addition to the polyether and polyester polyols, hydroxy-containing acrylic polymers or acrylic polyols can be used as the polyol component.

Among the acrylic polymers are interpolymers of about 0.2 to 10 percent by weight hydroxy-containing vinyl monomers such as hydroxyalkyl acrylate and methacrylate having 2 to 6 carbon atoms in the alkyl group and 90 to 99.8 percent by weight of other ethylenically unsaturated copolymerizable materials such as alkyl acrylates and methacrylates; the percentages by weight being based on the total weight of the monomeric charge.

Examples of suitable hydroxyalkyl acrylates and methacrylates are acrylic acid and methacrylic acid esters of ethylene glycol and propylene glycol. Also useful are hydroxy-containing esters and/or amides of unsaturated acids such as maleic acid, fumaric acid, itaconic acid and the like.

Examples of suitable alkyl acrylates and methacrylates are lauryl methacrylate, 2-ethylhexyl methacrylate and n-butyl acrylate.

Besides the acrylates and methacrylates, other copolymerizable monomers which can be copolymerized with the hydroxyalkyl acrylates and methacrylates are ethylenically unsaturated materials such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids and the like. Examples of such monomers include styrene, 1,3-butadiene, acrylamide, acrylonitrile, alpha-methyl styrene, alpha-methyl chlorostyrene, vinyl butyrate, vinyl acetate, allyl chloride, divinyl benzene, diallyl itaconate, triallyl cyanurate and mixtures thereof. Usually these other ethylenically unsaturated materials are used in admixture with the above-mentioned acrylates and methacrylates.

Besides the above-mentioned polymeric polyols, polyurethane polyols can also be used. These polyols can be prepared by reacting any of the above-mentioned polyols with a minor amount of polyisocyanate (OH/NCO equivalent ratio greater than 1:1) so that free hydroxyl groups are present in the product. In addition to the high molecular weight polyols mentioned above, mixtures of both high molecular weight and low molecular weight polyols may be used. Among the low molecular weight polyols are diols and triols such as aliphatic polyols including alkylene polyols containing from 2 to 18 carbon atoms. Examples include ethylene glycol, 1,4-butanediol, 1,6-hexanediol; cycloaliphatic polyols such as 1,2-hexanediol and cyclohexanedimethanol. Examples of triols include trimethylolpropane and trimethylolethane. Also useful are polyols containing ether linkages such as diethylene glycol and triethylene glycol. Also acid-containing polyols such as dimethylolpropionic acid can also be used.

The organic polyol component is generally present in the claimed composition in an amount ranging from about 15 percent to about 70 percent, preferably from about 25 to about 55 percent, the percentages being based on the total resin solids content of the coating composition.

The organic isocyanate which is used to prepare the polyurethane polyols can be an aliphatic or an aromatic isocyanate or a mixture of the two. Also, higher polyisocyanates are preferred although diisocyanates and monoisocyanates can be used in place of or in combination with the higher polyisocyanates. Where higher functionality polyisocyanates are used, some reactive material to reduce the functionality of the polyisocyanate can be used, for example, polyols and amines or polyamines. Also, some monofunctional isocyanate may be present. Examples of suitable monoisocyanates are butyl isocyanate, cyclohexyl isocyanate, phenyl isocyanate and toluene isocyanate. Examples of suitable aromatic diisocyanates are 4,4'-diphenylmethane diisocyanate, 1,3-phenylene diisocyanate, 1,4-phenylene diisocyanate and toluene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include 1,4-cyclohexyl diisocyanate, isophorone diisocyanate, and 4,4'-methylene-bis(cyclohexyl isocyanate). Examples of suitable higher polyisocyanates are 1,2,4-benzene triisocyanate, polymethylene polyphenyl isocyanate, and isocyanurates and biurets of the diisocyanates described above.

The polyisocyanate crosslinking agent has been in large part described above in connection with the preparation of the polyurethane polyols. In addition to the materials described above, the polyisocyanate can also be blocked. Examples of suitable blocking agents are those materials which would unblock at elevated temperatures such as lower aliphatic alcohols such as methanol, oximes such as methyl ethyl ketone oxime, and lactams such as caprolactam. Blocked isocyanates can be used to form stable one-package systems. Polyfunctional isocyanates with free isocyanate groups can be used to form two package room temperature curable systems. In these systems the polyisocyanate crosslinking agent is added to the composition just prior to application.

The polyisocyanate crosslinking agent is generally present in the claimed compositions in an amount ranging from about 15 percent to about 70 percent, preferably from about 25 percent to about 55 percent, the percentages being based on the total resin solids content of the coating composition.

The polyepoxides are those materials having a 1,2 epoxide group present in the molecule. Hydroxyl groups may also be present and often are. Polyepoxides contain more than one 1,2-epoxy group per molecule. In general, the epoxide equivalent weight can range from about 280 to about 4,000. These polyepoxides are saturated or unsaturated, cyclic or acyclic, aliphatic, alicyclic, aromatic or heterocyclic. They can contain substituents such as halogen, hydroxyl and ether groups.

One useful class of polyepoxides comprises the epoxy polyethers obtained by reacting an epihalohydrin (such as epichlorohydrin or epibromohydrin) with a polyphenol in the presence of an alkali. Suitable polyphenols include resorcinol, catechol, hydroquinone, bis(4-hydroxyphenyl)-2,2-propane, i.e., bisphenol A; bis(4-hydroxyphenyl)-1,1-isobutane; 4,4-dihydroxybenzophenone; bis(4-hydroxyphenyl)-1,1-ethane; bis(2-hydroxynaphenyl)-methane; and 1,5-hydroxynaphthalene. One very common polyepoxide is a polyglycidyl ether of a polyphenol, such as bisphenol A.

Another class of epoxy resins are the polyglycidyl ethers of polyhydric alcohols. These compounds may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, trimethylolpropane, and bis(4-hydroxycyclohexyl)-2,2-propane.

Another class of epoxide resins are the polyglycidyl esters of polycarboxylic acids. These compounds are produced by the reaction of epichlorohydrin or a similar epoxy compound with an aliphatic or aromatic polycarboxylic acid such as oxalic acid, succinic acid, glutaric acid, terephthalic acid, 2,6-naphthalene dicarboxylic acid and dimerized linoleic acid.

Still another class of polyepoxides are derived from the epoxidation of an olefinically unsaturated alicyclic compound. These polyepoxides are non-phenolic and are obtained by epoxidation of alicyclic olefins, for example, by oxygen and selected metal catalysts, by perbenzoic acid, by acid-aldehyde monoperacetate or by peracetic acid. Among such polyepoxides are the epoxy alicyclic ethers and esters well known in the art.

Useful polyepoxides also include those containing oxyalkylene groups in the epoxy molecule. Another class of polyepoxides consists of the epoxy novolac resins. These resins are obtained by reacting an epihalohydrin with the condensation product of aldehyde and monohydric or polyhydric phenols. A typical example is the reaction product of epichlorohydrin with a phenolformaldehyde condensate.

Another group of epoxide containing materials includes acrylic copolymers containing copolymerized glycidyl acrylate or methacrylate units. These acrylic copolymers can be prepared by the reaction of alkyl esters of alpha,beta unsaturated mono- or di-carboxylic acids with either glycidyl acrylate or methacrylate. Other glycidyl containing copolymerizable monomers such as diglycidyl itaconate and diglycidyl maleate also can be used. These monomers can be optionally copolymerized in the presence of other copolymerizable monomers such as vinyl aromatic compounds, such as styrene or vinyl toluene, and also acrylonitrile or methacrylonitrile.

In addition, all of the polyepoxides described above can be utilized with a portion or all of the 1,2 epoxy groups being phosphatized. In one preferred embodiment a portion of the polyepoxide is phosphatized. It is believed that the phosphated polyepoxide contributes to increased adhesion.

The polyepoxide is generally present in the claimed compositions in an amount ranging from about 5 percent to about 40 percent, preferably from about 10 percent to about 35 percent, the percentages being based on the total resin solids content of the coating composition.

The phenolic resins commonly referred to as phenoplasts are obtained by the condensation of phenol or alkyl substituted phenols with aldehydes. The monohydric phenols such as phenol, cresol and xylenol are the most typically utilized since they are readily available and relatively inexpensive. Phenol is the typically preferred monohydric phenol. Polyhydric phenols such as resorcinol can also be used herein. Formaldehyde is the preferred aldehyde used in the production of the phenolic resins. Other aldehydes which are also useful include acetaldehyde, butyraldehyde and furfuraldehyde. The preferred phenolic resin is produced by the condensation of phenol and formaldehyde.

The phenolic resin is present in the claimed compositions in an amount ranging from about 1 to about 20 percent, preferably from about 5 to about 10 percent, the percentages being based on the total resin solids content of the coating composition.

A very important aspect of the aforedescribed coating composition is its flexibility as evidenced by the elongation of the cured coating. The claimed coating compositions when cured generally have an elongation of at least 10 percent, preferably at least 15 percent, and more preferably within the range of from 20 percent to 25 percent. The elongation is determined with an Instron Tester according to ASTM D638-72. The test is conducted at a speed of 20 inches per minute utilizing a sample measuring 0.25 inch in width. The sample is taken from a "free film", that is, one which has been removed from the substrate. (Briefly, the coating composition is applied onto a substrate which has been pretreated with a lubricant that permits the cured film to be peeled from the substrate.) The flexibility of the claimed compositions is particularly advantageous when the coating compositions are utilized as primers in forming a substrate with a multilayer coating. The flexibility of the primer contributes greatly to the flexibility of the multicoat system. This is especially useful in the coil coating area because flat coils of substrate can be coated first and then fabricated into the desired article without detracting from the appearance properties. Moreover, because of the flexible character, the primer composition can be applied at relatively thicker films than conventional primer compositions without sacrificing the ease of fabrication. An advantage of a primer being applied at thicker film builds is the increased protection it affords the substrate as a barrier to minimizing physical damage and also to corrosive atmospheric pollutants which might be transferred from upper film layers.

It should be understood that in addition to the components described above, the claimed coating compositions useful as primers also can contain pigments and additives known to those skilled in the art. Moreover, the compositions are typically prepared in a suitable solvent to facilitate formulation and application.

Several different pigments can be used in the compositions. Inorganic pigments which are useful include titanium dioxide, silica, iron oxides, talc, mica, clay, zinc oxide, strontium chromate, zinc chromate, carbon black, lead chromate, molybdate orange, calcium carbonate, and barium sulfate. Organic pigments can also be used herein.

Suitable solvents include the aromatic petroleum distillates, cyclohexane, methyl ethyl ketone, methyl isobutyl ketone, alcohols such as ethyl alcohol, propyl alcohol and diacetone alcohol, dimethyl phthalate, and mono- and dialkyl ethers of ethylene and diethylene glycol, such as ethylene glycol monoethyl ether, ethylene glycol monobutyl ether, ethylene glycol monoethyl ether acetate, diethylene glycol monobutyl ether and diethylene glycol diethyl ether.

Conventional additives include surfactants, antioxidants, ultraviolet light absorbers, stabilizers, rheology control agents, coalescing agents and the like.

The present invention also relates to a method of providing a substrate with a multilayer coating and coated substrates produced by the method.

The method comprises, as a first step, (a), applying a flexible primer coating composition to a substrate, the primer composition having an elongation of at least 10 percent when cured. The primer coating composition utilized in this first step of the method has been described in detail above, therefore, it will not be described again here. As was mentioned in the discussion above, an important aspect of the primer composition which lends to the flexibility of the ultimate multilayer coating is the flexibility as evidenced by the elongation.

The claimed process is suitable for coating a wide variety of metal substrates including steel and aluminum. A variety of steel substrates are available and any of these are suitable herein, for example, cold-rolled steel, hot dip galvanized steel, aluminized steel, as well as steels clad with zinc/aluminum alloys. Once the primer coating composition has been applied to the substrate, in the second step of the method, (b), a pigmented coating composition is applied to the coated substrate of (a). This pigmented coating composition can be applied over the primer coating wet-on-wet, that is, the coated substrate can be subsequently coated without first being dried. Alternatively, the primer can be partially cured by baking prior to the application of the pigmented coat. In a preferred embodiment the coated substrate of step (a) is baked for a period of from about 20 seconds to about 180 seconds at a temperature of from about 200° C. to about 260° C. prior to application of the pigmented coating composition of step (b).

The pigmented coating composition of step (b), which is applied over the primer composition of step (a), comprises a fluorocarbon polymer. Preferably the pigmented coating composition additionally comprises an adjuvant polymer different from the fluorocarbon polymer and adapted to modify the properties of the fluorocarbon polymer. The adjuvant polymer is preferably an acrylic polymer.

Several different film-forming fluorocarbon polymers are useful in the present invention. Such polymers include the polyvinyl fluorides, polyvinylidene fluorides, vinyl fluoride copolymers, and vinylidene fluoride copolymers. The preferred film-forming fluorocarbon polymer is polyvinylidene fluoride. The copolymers include at least 75 percent by weight, preferably 90 percent or more of vinyl or vinylidene fluoride units. Examples of monomers to be copolymerized with vinyl fluoride or vinylidene fluoride are ethylene, propylene, isobutylene, styrene, vinyl chloride, vinylidene chloride, difluorochloroethylene, tetrafluoroethylene, trifluoropropylene, hexafluoropropylene, vinyl formate, vinyl acetate, vinyl propionate, vinyl butyrate, acrylic acid and its salts, methyl methacrylate, allyl methacrylate, acrylonitrile, methacrylonitrile, N-butoxymethyl acrylamide, allyl acetate and isopropenyl acetate. Generally, the amount of fluorocarbon polymer in the claimed compositions ranges from about 45 percent to about 85 percent by weight, preferably from about 65 percent to about 75 percent by weight, the percentages based on the total weight of the resinous components of the composition.

The adjuvant polymer can be selected from a wide variety of polymeric materials which are suitable as modifiers for the fluorocarbon resins. For example, suitable modifiers include acrylic resins, polyester resins such as polyols, epoxy resins, and aminoplast resins such as melamine-formaldehyde condensates.

The particular adjuvant resin chosen depends upon the properties which are desired in modifying the fluorocarbon resin. For example, if one desires a softer, more flexible film, one can select a polyester resin whereas if hardness is desirable, one can select an aminoplast resin, acrylic resin or epoxy resin. Mixtures of these adjuvants can also be utilized.

Preferably, the adjuvant resin is an acrylic polymer. The acrylic polymer can be thermoplastic or thermosetting. Suitable thermoplastic acrylic polymers include polymers and copolymers of acrylic acid or methacrylic acid esters, for example, polymers and copolymers of esters formed by the reaction of acrylic or methacrylic acid with suitable alcohols such as methyl alcohol, ethyl alcohol, propyl alcohol, butyl alcohol and 2-ethylhexyl alcohol. One preferred thermoplastic acrylic resin is a copolymer of methyl methacrylate and ethyl acrylate. In one embodiment the thermosetting acrylic polymers are preferred. Suitable thermosetting acrylic polymers include polymers and copolymers of acrylic monomers containing active hydrogens such as the hydroxyalkyl esters of ethylenically unsaturated carboxylic acids and at least one other copolymerizable ethylenically unsaturated monomer. For example, a suitable thermosetting resin is that prepared from 2-hydroxyethyl acrylate, acrylic acid, N-butoxymethyl acrylamide and another copolymerizable ethylenically unsaturated monomer such as styrene, vinyl toluene, methyl styrene or ethyl styrene. The amount of acrylic polymer typically ranges from about 15 percent by weight to about 55 percent by weight, preferably from about 25 percent to about 35 percent by weight, the percentages based on the total weight of the resinous components of the composition.

The polyester and epoxy resins which have been described above in connection with the primer composition can also be utilized as the adjuvant resin. These have been discussed in detail above, therefore, no additional description will be included here. Aminoplast resins can also be utilized as adjuvants and these are described below.

Aminoplast resins are based on the addition products of formaldehyde, with an amino- or amido-group carrying substance. Condensation products obtained from the reaction of alcohols and formaldehyde with melamine, urea or benzoguanamine are most common and preferred herein. These condensation products can be monomeric or polymeric. Condensation products of other amines and amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like.

While the aldehyde employed is most often formaldehyde, other similar condensation products can be made from other aldehydes, such as acetaldehyde, crotonaldehyde, acrolein, benzaldehyde, furfural, glyoxal and the like.

The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers, of glycols such as CELLOSOLVES and CARBITOLS, and halogen-substituted or other substituted alcohols, such as 3-chloropropanol and butoxyethanol. The preferred aminoplast resins are substantially alkylated with methanol or butanol.

Once the pigmented coating composition has been applied to the primed substrate, in the third step of the method, (c), a clear coating composition is applied to the coated substrate of (b). As was mentioned above for step (b), this clear coating composition can also be applied wet-on-wet over the pigmented composition or alternatively, the pigmented composition can be partially cured by baking prior to the application of the clear coat. In a preferred embodiment the coated substrate of step (b) is baked for a period of from about 20 seconds to about 180 seconds at a temperature of from about 200° C. to about 260° C. prior to application of the clear coating composition of step (c).

The clear coating composition of step (c) which is applied over the pigmented coating composition of step (b) also comprises a fluorocarbon polymer. Preferably the clear coating composition additionally comprises an adjuvant polymer different from the fluorocarbon polymer and adapted to modify its properties. The adjuvant polymer is preferably an acrylic polymer. In this preferred embodiment the clear coating composition comprises from about 45 percent to about 85 percent of fluorocarbon polymer and from 15 percent to 55 percent of acrylic polymer on a resin solids basis. More preferably the clear coating composition comprises from about 65 percent to about 75 percent of the fluorocarbon polymer and from about 25 percent to about 35 percent of the acrylic polymer, on a resin solids basis. The fluorocarbon polymers and acrylic polymers have been described in detail, above, in connection with the pigmented fluorocarbon polymer based coating composition of step (b). The adjuvant polymers described in detail above are also useful here.

The clear coating compositions can be formulated with the sase types of solvents and additives as have been described above in connection with the pigmented coating composition. The clear compositions are, of course, unpigmented.

Once the clear coating composition is applied, the primed substrate coated with pigmented and clear compositions is baked at a temperature of from about 200° C. to about 260° C. for a period ranging from about 20 seconds to about 180 seconds. This final baking step has the effect of removing the solvent present as well as causing the coating layers to fuse together in a bonding process.

The substrate with the multilayer coating is extremely flexible as is evidenced by an elongation of the cured system of at least 10 percent, preferably at least 15 percent and more preferably within the range of from about 20 to 25 percent. The elongation is determined as has been described above in connection with the primer composition. In addition, the coated substrate has excellent durability and resistance to weathering and aggressive environments such as those heavy with industrial pollutants or marine environments.

Moreover, a very important aspect of the claimed invention is that the aforementioned advantages are achieved without the necessity of high film builds. The film thickness of the claimed multicoat system is less than that required by systems based on plastisols or organosols. In other words, one achieves thick film protection at thinner film builds. The dry film thickness of the primer coating composition usually ranges from about 0.2 mil to about 1.5 mils; the dry film thickness of the pigmented coating composition ranges from about 0.5 mil to about 1.5 mils; and the dry film thickness of the clear coating composition ranges from about 0.2 mil to about 1.0 mil. In a plastisol based system, for example, a primer coat typically ranges from about 0.1 to 1.0 mil and the topcoat from about 2 to 12 mils.

Thus, the claimed multilayer coated substrate demonstrates not only superior fabricability, but also adhesion of the coatings, abrasion resistance, mar resistance, and resistance to weathering and industrial pollutants. The clear coating contributes greatly to this result. In addition to acting as a barrier to minimize the transfer of corrosive pollutants to the underlying layers, it is also very important to the mar resistance.

The following examples are only illustrative of the claimed invention and are not meant to limit it to their details.

EXAMPLE I

A. Preparation of Primer Coating Composition

| Ingredients | Parts by Weight (grams) |
| --- | --- |
| polyester polyol[1] | 7.3 |
| grind paste[2] | 87.4 |
| polyepoxide[3] | 10.0 |
| blocked isocyanate[4] | 29.0 |
| dibutyltin dilaurate | 1.0 |
| phenolic resin[5] | 5.0 |
| phosphoric acid (40 percent) | 1.3 |
| phosphated polyepoxide[6] | 8.5 |

[1]This polyester polyol having a hydroxyl value of 63 was prepared from 1,6 hexanediol, trimethylolpropane, adipic acid, and isophthalic acid.
[2]This grind paste was prepared from the following ingredients in the indicated proportions:

| Ingredients | Parts by Weight (grams) |
| --- | --- |
| polyester polyol of footnote[1] | 27.1 |
| diacetone alcohol | 9.1 |
| isophorone | 9.1 |
| clay | 12.2 |
| titanium dioxide | 12.2 |
| strontium chromate | 5.9 |
| bentone clay | 0.8 |
| silica | 8.5 |

The grind paste was prepared by initially combining the polyester polyol, diacetone alcohol and isophorone followed by adding the dry pigments. Ceramic beads were added to the mixture, and it was subjected to high speed agitation until a Hegman 7 grind was achieved.
[3]This polyepoxide is commercially available from Shell Chemical Company as EPON 1001. It is a reaction product of bisphenol A and epichlorohydrin having an epoxy equivalent weight of 450 to 550.
[4]This blocked isocyanate curing agent was prepared by blocking the biuret from 1,6-hexamethylene diisocyanate commercially available from Bayer as DESMODUR N with methyl ethyl ketoxime.
[5]This phenolic resin is a phenol-formaldehyde condensate commercially available from General Electric under the trademark designation METHYLON.
[6]Phosphatized EPON 836 which is a diglycidyl ether of bisphenol A having a number average molecular weight within the range of from 550 to 770.

The primer coating composition was prepared by simply combining the listed ingredients with mild agitation.

The cured primer coating composition had an elongation of from 19 to 20 percent determined with an Instron Tester according to ASTM D638-72.

B. Preparation of Pigmented Coating Composition

| Ingredients | Parts by Weight (grams) |
| --- | --- |
| thermosetting acrylic polymer[7] | 136 |
| diethylene glycol monobutyl ether | 241 |
| dibasic ester[8] | 7 |
| RESIMENE 731[9] | 26 |
| grind paste[10] | 374 |
| KYNAR 500[11] | 287 |

[7]This thermosetting acrylic polymer is an interpolymer of 62 percent methyl methacrylate, 27 percent ethyl acrylate, 9 percent N—butoxy methyl acrylamide, and 2 percent methacrylic acid at 50 percent resin solids in isophorone.
[8]This ester is commercially available from E. I. Dupont de Nemours as DBE.
[9]This melamine formaldehyde crosslinking agent is commercially available from Monsanto Chemical Corporation.
[10]The grind paste was prepared from the following ingredients in the indicated proportions:

| Ingredients | Parts by Weight (grams) |
| --- | --- |
| thermosetting acrylic polymer of footnote[7] | 78 |
| diethylene glycol monobutyl ether | 85 |
| flow modifier[a] | 4 |
| bentone clay | 4 |
| copper/chromium mixed oxide | 8 |
| red iron oxide | 0.2 |
| titanium dioxide | 16.7 |
| chromium/antimony/titanium mixed oxide | 18 |
| petrolatum wax | 8 |

[a]This homopolymer of 2-ethylhexyl acrylate can be commercially obtained from Monsanto Chemical Corporation as MODAFLOW. The grind paste was processed by adding ceramic beads to the ingredients and agitating at high speed to a 7.5 Hegman grind.
[11]Polyvinylidene fluoride commercially available from Pennwalt.

The pigmented coating composition was prepared by combining the ingredients together and agitating with ceramic beads at high speed to a 5.5 Hegman grind.

C. Preparation of Clear Coating Composition

| Ingredients | Parts by Weight (grams) |
| --- | --- |
| thermosetting acrylic polymer[12] | 294 |
| isophorone | 309 |
| KYNAR 500 | 319 |
| silica flatting pigment[13] | 11 |
| petrolatum wax | 10 |

[12]This acrylic polymer was detailed above in footnote[7].
[13]Commercially available from Davison as SYLOID 308.

The clear coating composition was prepared by combining the ingredients together and agitating with ceramic beads at high speed to a 5.5 Hegman grind.

The test panels according to the claimed invention were prepared in the following way.

A hot dip galvanized steel panel (G90HDG pretreated with BONDERITE 1303) measuring 4 inches × 12 inches, was coated using a wirewound bar with a 0.8 mil thick film of the primer coating composition detailed above (composition A). The panel was baked for 40 seconds to a peak metal temperature of 465° F. (240° C.). The coated panel was then coated with a 0.8 mil thick film of the pigmented, fluoropolymer-based coating composition detailed above and baked for 40 seconds to a peak metal temperature of 465° F. (240° C.). Finally, the panel which was coated as detailed above was topcoated with the clear, fluoropolymer based coating composition detailed above at a thickness of 0.8 mil. The coated metal panel was then baked for 40 seconds to a peak metal temperature of 465° F. (240° C.). The elongation of the cured multilayer coating was 19 to 20 percent determined with an Instron Tester according to ASTM D638-72. As a comparative test, a panel was prepared as detailed above except that a conventional primer coating composition (composition X) was utilized at a thickness of 0.2 mil. The primer was prepared from 67 weight percent epoxy resin and 33 weight percent urea-formaldehyde resin pigmented with 6 percent titanium dioxide, 13 weight percent strontium chromate and 51 weight percent clay in a solvent blend of 12 weight percent butanol, 20 weight percent diacetone alcohol and 68 percent aromatic petroleum distillates. The test panels were evaluated for physical properties according to the following tests. The results are set out in Table I, below.

TESTS

SALT SPRAY: Prior to being subjected to the conditions of this test the coated test panels were prepared as follows: A scribe mark was scored along the length of the center of the panel; three of the edges of the panel were covered with a protective primer coating composition commercially available from PPG Industries, Inc., under the trademark designation MULTIPRIME, so that only one cut edge was exposed; a 120 degree bend was formed into one side of the panel; and a reverse impact indentation was introduced along one side of the panel. The face of the panel was that portion which was flat and free of indentations or markings.

The aforedescribed coated test panels were exposed continuously to a salt water spray (5 percent solution of salt in water) at 100° F. (38° C.) and 100 percent relative humidity according to ASTM B117.

The panels were rated for the average amount of corrosion or loss of paint extending from the scribe mark (scribe creepage) as well as the amount of blistering on the exposed edge, 120 degree bend and indentation of the panel.

The panels were rated on a scale of 0 to 10 for the amount of corrosion extending from the scribe. A score of 0 for the scribe creepage means that the corrosion had extended seven-eighths of an inch to one inch or more from the scribe mark. A score of 10 means that there was essentially no corrosion extending from the scribe mark. Values within the indicated scale endpoints are indicative of varying degrees of corrosion extending from the scribe mark as set out below:

| Average Measurement of Corrosion from Scribe | | |
| --- | --- | --- |
| inches | mm | Rating |
| 0 | 0 | 10 |
| 1/64 | 0.4 | 9 |
| 1/32 | 0.8 | 8 |
| 1/16 | 1.6 | 7 |
| ⅛ | 3.2 | 6 |
| 3/16 | 4.8 | 5 |
| ¼ | 6.4 | 4 |
| ⅜ | 9.5 | 3 |
| ½ | 12.7 | 2 |
| ⅝ | 15.9 | 1 |
| ⅞ to 1 or more | 25 or more | 0 |

The panels were also rated on a scale of 0 to 10 for the amount of blistering. A score of 10 for the blistering means that there was essentially no blistering in the indicated areas of the panel. A score of 0 means that more than 75 percent of the indicated area contained blisters. Values within the indicated scale endpoints are indicative of varying degrees of blistering as set out below.

| Amount of area Containing Blisters (Percent) | Rating |
| --- | --- |
| 0 | 10 |
| 1 | 9 |
| 2 | 8 |
| 5 | 7 |
| 7 to 10 | 6 |
| 7 to 10, larger spots | 5 |
| 10 to 25 | 4 |
| 25 to 40 | 3 |
| 40 to 60 | 2 |
| 60 to 70 | 1 |
| greater than 70 | 0 |

HUMIDITY RESISTANCE: For this test the coated test panels were used as the ceiling of a condensing humidity chamber (QCT chamber) with the coating directed inwardly to the chamber. The chamber was heated to 140° F. (60° C.) and about a 2 inch level of water was located 3 to 5 inches below the test panels (panels sloped).

The panels were rated on a scale of 0 to 10 for the amount of blistering as has been described above.

The panels were also rated for the amount of loss of adhesion as determined by the "Nickel Scratch" test. In this test the edge of a nickel was firmly drawn down along the paint film. The area thus tested was observed for the amount of film removal. A score of "Good" means that the film was essentially unaffected. A score of "Fair" means that there was some film removal but the metal substrate was not exposed. A score of "Poor" means that there was total film removal and exposure of the metal substrate.

KESTERNICH: This is a pollution resistance test. The test was conducted according to DIN 50018. The test consisted of exposure of the coated panels to 25 cycles in a Kesternich apparatus. One cycle consisted of 8 hours at 40° C. (104° F.) with 100 percent relative condensing humidity in a controlled sulfur dioxide and carbon dioxide atmosphere (2 liters of sulfur dioxide and 2 liters of carbon dioxide) followed by 16 hours of dry time.

The panels were rated on a scale of 0 to 10, as has been described above, for the amount of blistering on the face of the panel. In addition, for this test the size of the blisters was rated on a scale of Nos. 0 to 10. A score of No. 10 means no blistering. A score of No. 0 means very large size blisters. Values within these endpoints indicate a progression in size: No. 9; No. 8-smallest size blister seen by naked eye; No. 7; Nos. 6; 5; 4; 3; 2; 1. The results for the above described test are set out in Table I below.

TABLE I

| | Panel Using Composition A* | Comparative Panel Using Composition X** |
| --- | --- | --- |
| SALT SPRAY (1000 hours) | | |
| scribe creepage | 10 | 7 |
| blisters | | |
| bend | 10 | 7 |
| edge | 6 | 6 |
| indent | 10 | 10 |
| HUMIDITY RESISTANCE (1000 hours) 140° F. | | |
| blisters | 10 | 10 |
| adhesion | good | good |
| KESTERNICH (25 cycles) | | |

TABLE I-continued

| | Panel Using Composition A* | Comparative Panel Using Composition X** |
|---|---|---|
| blisters | 10/No. 10 | 0/No. 6 |

*This panel was prepared using the primer of the claimed invention detailed above; the pigmented fluoropolymer based coating composition; and the clear fluoropolymer based coating composition also detailed above.

**This comparative panel was prepared using the conventional primer detailed above; the pigmented fluoropolymer based coating composition; and the clear fluoropolymer based coating composition also detailed above.

What is claimed is:

1. A method of providing a substrate with a multilayer coating comprising:
   a. applying a flexible primer coating composition to a substrate, said primer coating composition comprising an organic polyol, a polyepoxide, a blocked polyisocyanate curing agent, and a phenolic resin and having an elongation of at least 10 percent when cured;
   b. applying a pigmented coating composition to the coated substrate of step (a), said pigmented coating composition comprising a fluorocarbon polymer;
   c. applying a clear coating composition to the coated substrate of step (b), said clear coating composition comprising a fluorocarbon polymer; and
   d. at least partially curing the coated substrate of step (c);
   said multilayer coating having an elongation of at least 10 percent cured.

2. The method of claim 1 wherein the pigmented coating composition additionally comprises an adjuvant polymer different from the fluorocarbon polymer and adapted to modify the properties of the fluorocarbon polymer.

3. The method of claim 2 wherein the adjuvant polymer is an acrylic polymer.

4. The method of claim 3 wherein the pigmented coating composition comprises from about 45 percent to about 85 percent of the fluorocarbon polymer, from about 15 percent to about 55 percent of the acrylic polymer, on a resin solids basis.

5. The method of claim 1 wherein the clear coating composition additionally comprises an adjuvant polymer different from the fluorocarbon polymer.

6. The method of claim 5 wherein the adjuvant polymer is an acrylic polymer.

7. The method of claim 6 wherein the clear coating composition comprises from about 45 percent to about 85 percent of the fluorocarbon polymer, and from about 15 percent to about 55 percent of the acrylic polymer, on a resin solids basis.

8. The method of claim 1 wherein the dry film thickness of the primer coating composition ranges from about 0.2 mil to about 1.5 mils; the dry film thickness of the pigmented coating composition ranges from about 0.5 mil to about 1.5 mils; and the dry film thickness of the clear coating composition ranges from about 0.2 mil to about 1.0 mil.

9. The method of claim 4 wherein the pigmented coating composition comprises from about 65 percent to about 75 percent of the fluorocarbon polymer and from about 25 percent to about 35 percent of the acrylic polymer, on a resin solids basis.

10. The method of claim 7 wherein the clear coating composition comprises from about 65 percent to about 75 percent of the fluorocarbon polymer and from about 25 percent to about 35 percent of the acrylic polymer, on a resin solids basis.

11. The method of claim 1 wherein the acrylic polymer of steps (b) and (c) is a thermosetting acrylic polymer.

12. The method of claim 1 wherein the fluorocarbon polymer of steps (b) and (c) is polyvinylidene fluoride.

13. The method of claim 1 wherein the coated substrate of step (a) is baked for a period of from about 20 seconds to about 180 seconds at a temperature of from about 200° C. to about 260° C. prior to application of the pigmented coating composition of step (b).

14. The method of claim 1 wherein the coated substrate of step (b) is baked for a period of from about 20 seconds to about 180 seconds at a temperature of from about 200° C. to about 260° C. prior to application of the clear coating composition of step (c).

15. The method of claim 1 wherein the coated substrate of step (c) is baked for a period of from about 20 seconds to about 180 seconds at a temperature of from about 200° C. to about 260° C.

16. The method of claim 1 wherein the substrate is steel.

17. The method of claim 1 wherein the substrate is aluminum.

18. A coated article produced by the method of claim 1.

19. A method of providing a substrate with a multilayer coating comprising:
   a. applying a flexible primer coating composition to a substrate, said primer coating composition being a two package coating composition comprising an organic polyol, polyepoxide, a free polyisocyanate crosslinking agent and a phenolic resin, with the proviso that the organic polyol is present in one package and the polyisocyanate crosslinking agent is present in a second package, said coating composition having an elongation of at least 10 percent when cured;
   b. applying a pigmented coating composition to the coated substrate of step (a), said pigmented coating composition comprising a fluorocarbon polymer;
   c. applying a clear coating composition to the coated substrate of step (b), said clear coating composition comprising a fluorocarbon polymer; and
   d. at least partially curing the coated substrate of step (c);
   said multilayer coating having an elongation of at least 10 percent when cured.

20. The method of claim 1 wherein the polyisocyanate is blocked with a lower aliphatic alcohol.

21. The method of claim 1 wherein the polyisocyanate is blocked with an oxime.

22. The method of claim 21 wherein the oxime is methyl ethyl ketone oxime.

23. The method of claim 1 wherein the polyisocyanate is blocked with a lactam.

24. The method of claim 23 wherein the lactam is epsilon-caprolactam.

25. The method of claim 1 wherein the organic polyol has a number average molecular weight of from about 500 to about 20,000 and a hydroxyl number from about 30 to about 200.

26. The method of claim 1 wherein the epoxide equivalent weight of the polyepoxide ranges from about 280 to about 4,000.

27. A method of providing a substrate with a multilayer coating comprising:

(a) applying a flexible primer coating composition to a substrate, said primer coating composition being a two package coating composition comprising: a first package comprising an organic polyol, a polyepoxide and a phenolic resin and a second package comprising a free polyisocyanate crosslinking agent, said coating composition having an elongation of at least 10 percent when cured;

(b) applying a pigmented coating composition to the coated substrate of step (a), said pigmented coating composition comprising a fluorocarbon polymer;

(c) applying a clear coating composition to the coated substrate of step (b), said clear coating composition comprising a fluorocarbon polymer; and (d) at least partially curing the coated substrate of step (c); said multilayer coating composition having an elongation of at least 10 percent when cured.

* * * * *